US010009318B2

(12) United States Patent
Shao

(10) Patent No.: US 10,009,318 B2
(45) Date of Patent: Jun. 26, 2018

(54) CONNECTING TO A CLOUD SERVICE FOR SECURE ACCESS

(75) Inventor: Hui Shao, Shanghai (CN)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 499 days.

(21) Appl. No.: 13/419,434

(22) Filed: Mar. 14, 2012

(65) Prior Publication Data
US 2013/0246629 A1 Sep. 19, 2013

(51) Int. Cl.
G06F 15/16 (2006.01)
H04L 29/06 (2006.01)

(52) U.S. Cl.
CPC .......... H04L 63/0272 (2013.01); H04L 63/04 (2013.01); H04L 63/08 (2013.01)

(58) Field of Classification Search
CPC ............ H04L 61/3025; H04L 63/0823; H04L 61/1511; H04L 63/1441; H04L 9/00; H04L 63/0815; G06F 12/14; G06F 21/00; G06F 21/60; G06F 9/4443; H04W 12/06; H04K 3/20; G09C 5/00; Y10S 707/99939
USPC ........................................................ 709/227
See application file for complete search history.

(56) References Cited

U.S. PATENT DOCUMENTS

| | | | | |
|---|---|---|---|---|
| 5,987,440 A * | 11/1999 | O'Neil | ................... | G06Q 10/10 705/39 |
| 6,185,567 B1 * | 2/2001 | Ratnaraj | ........... | G06F 17/30893 |
| 6,324,648 B1 * | 11/2001 | Grantges, Jr. | ........... | H04L 63/02 709/229 |
| 6,502,135 B1 * | 12/2002 | Munger et al. | ................ | 709/225 |
| 6,711,679 B1 * | 3/2004 | Guski | ................. | H04L 63/0428 713/156 |
| 6,760,324 B1 * | 7/2004 | Scott | ....................... | H04L 45/02 370/352 |
| 6,966,060 B1 * | 11/2005 | Young | ....................... | G06F 8/60 709/203 |
| 6,976,164 B1 * | 12/2005 | King | .................... | G06Q 20/202 705/21 |
| 7,039,946 B1 * | 5/2006 | Binding | .............. | H04L 63/0823 380/259 |
| 7,299,491 B2 * | 11/2007 | Shelest et al. | ..................... | 726/4 |
| 7,609,701 B2 * | 10/2009 | Yang et al. | .............. | 370/395.52 |
| 7,827,590 B2 * | 11/2010 | Hopen | ................ | G06F 21/6236 709/224 |

(Continued)

OTHER PUBLICATIONS

"Administrative Domain". Wikipedia.com. retrieved Sep. 27, 2017. 1 page.*

(Continued)

Primary Examiner — John Macilwinen

(57) ABSTRACT

A client may connect to a server over an insecure network by downloading and configuring a secure connection mechanism to the server. The secure connection mechanism may allow the client to join a domain when connected to the server and access domain level services. The server may receive a request from the client, classify the connection type, and used the classification to determine whether the request originated off premises. If so, the server may send a configuration mechanism to the client, which may then establish a secure connection to the server. Once the secure connection is established, the server may join the client to the server's domain and begin secure operations.

20 Claims, 3 Drawing Sheets

(56) References Cited

U.S. PATENT DOCUMENTS

| | | | |
|---|---|---|---|
| 2003/0037128 A1* | 2/2003 | Beadles | H04L 29/06 709/220 |
| 2003/0093666 A1* | 5/2003 | Millen et al. | 713/157 |
| 2004/0250119 A1* | 12/2004 | Shelest et al. | 713/201 |
| 2005/0257039 A1* | 11/2005 | Marshall | H04L 63/0272 713/1 |
| 2006/0174112 A1* | 8/2006 | Wray | 713/168 |
| 2007/0195800 A1* | 8/2007 | Yang et al. | 370/401 |
| 2008/0082662 A1* | 4/2008 | Dandliker et al. | 709/225 |
| 2008/0228654 A1* | 9/2008 | Edge | G01S 19/48 705/71 |
| 2008/0263215 A1* | 10/2008 | Schnellbaecher | 709/229 |
| 2009/0025080 A1* | 1/2009 | Lund | H04L 9/3273 726/15 |
| 2009/0129387 A1* | 5/2009 | Retana et al. | 370/392 |
| 2009/0235067 A1* | 9/2009 | Miller | H04L 63/0823 713/151 |
| 2010/0049839 A1 | 2/2010 | Parker et al. | |
| 2010/0070639 A1* | 3/2010 | Hoggan | 709/229 |
| 2010/0199133 A1* | 8/2010 | Katis et al. | 714/57 |
| 2011/0078246 A1* | 3/2011 | Dittmer-Roche | 709/205 |
| 2011/0125892 A1 | 5/2011 | Rajan et al. | |
| 2011/0145789 A1 | 6/2011 | Rasch et al. | |
| 2011/0154316 A1 | 6/2011 | Khosravi et al. | |
| 2011/0208838 A1* | 8/2011 | Thomas et al. | 709/219 |
| 2012/0110062 A1* | 5/2012 | Savage et al. | 709/203 |
| 2012/0110638 A1* | 5/2012 | Wu | 726/1 |
| 2012/0131646 A1* | 5/2012 | Chandolu | G06F 21/6218 726/4 |
| 2012/0158944 A1* | 6/2012 | Tiwari et al. | 709/224 |
| 2012/0294433 A1* | 11/2012 | Fan et al. | 379/142.1 |
| 2012/0303824 A1* | 11/2012 | Anderson et al. | 709/227 |
| 2013/0022033 A1* | 1/2013 | Shi | 370/338 |

OTHER PUBLICATIONS

"Domain". Microsoft Press. Mar. 15, 2002. p. 44 of pp. 1-58.*

Miculan, M. and Urban, C. "Formal analysis of Facebook Connection Single Sign-on authentication protocol". Dept. of Mathematics and Computer Science, University of Udine, Italy. pp. 1-13. 2011.*

M.C. Benvenuto, A.D. Keromytis. "EasyVPN: IPsec remote access made easy". Proceedings of the 17th USENIX Systems Administration Conference (LISA). Online printout from USENIX. 2003, pp. 1-11.*

"CSC and VMware Virtualization", Retrieved at << http://www.vmware.com/solutions/partners/global-alliances/csc/csc-solutions.html>>, Retrieved Date: Sep. 28, 2011, pp. 3.

"Cloud Computing and IBM InfoSphere Information Server", Retrieved at <<http://www-01.ibm.com/software/data/infosphere/cloud-computing/>>, Retrieved Date: Sep. 28, 2011, pp. 3.

"Cisco Collaborative Conferencing", Retrieved at <<http://www.cisco.com/en/US/docs/voice_ip_comm/cucm/srnd/8x/confernc.pdf>>, Retrieved Date: Sep. 28, 2011, pp. 50.

"Implementing Microsoft Windows Small Business Server code name "Aurora" preview build on HP ProLiant servers". Retrieved at <<http://h20000.www2.hp.com/bc/docs/support/SupportManual/c02510044/c02510044.pdf>>, Retrieved Date: Sep. 28, 2011, pp. 12.

* cited by examiner

CONNECTING TO A CLOUD SERVICE FOR SECURE ACCESS

BACKGROUND

Some connections between clients and servers use elevated security and authentication mechanisms to deliver various services. The services may include domain level connections through which access to secure file systems, computer maintenance operations, or other services that may manage access to secure data and client computer configuration.

SUMMARY

A client may connect to a server over an insecure network by downloading and configuring a secure connection mechanism to the server. The secure connection mechanism may allow the client to join a domain when connected to the server and access domain level services. The server may receive a request from the client, classify the connection type, and use the classification to determine whether the request originated off premises. If so, the server may send a configuration mechanism to the client, which may then establish a secure connection to the server. Once the secure connection is established, the server may join the client to the server's domain and begin secure operations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
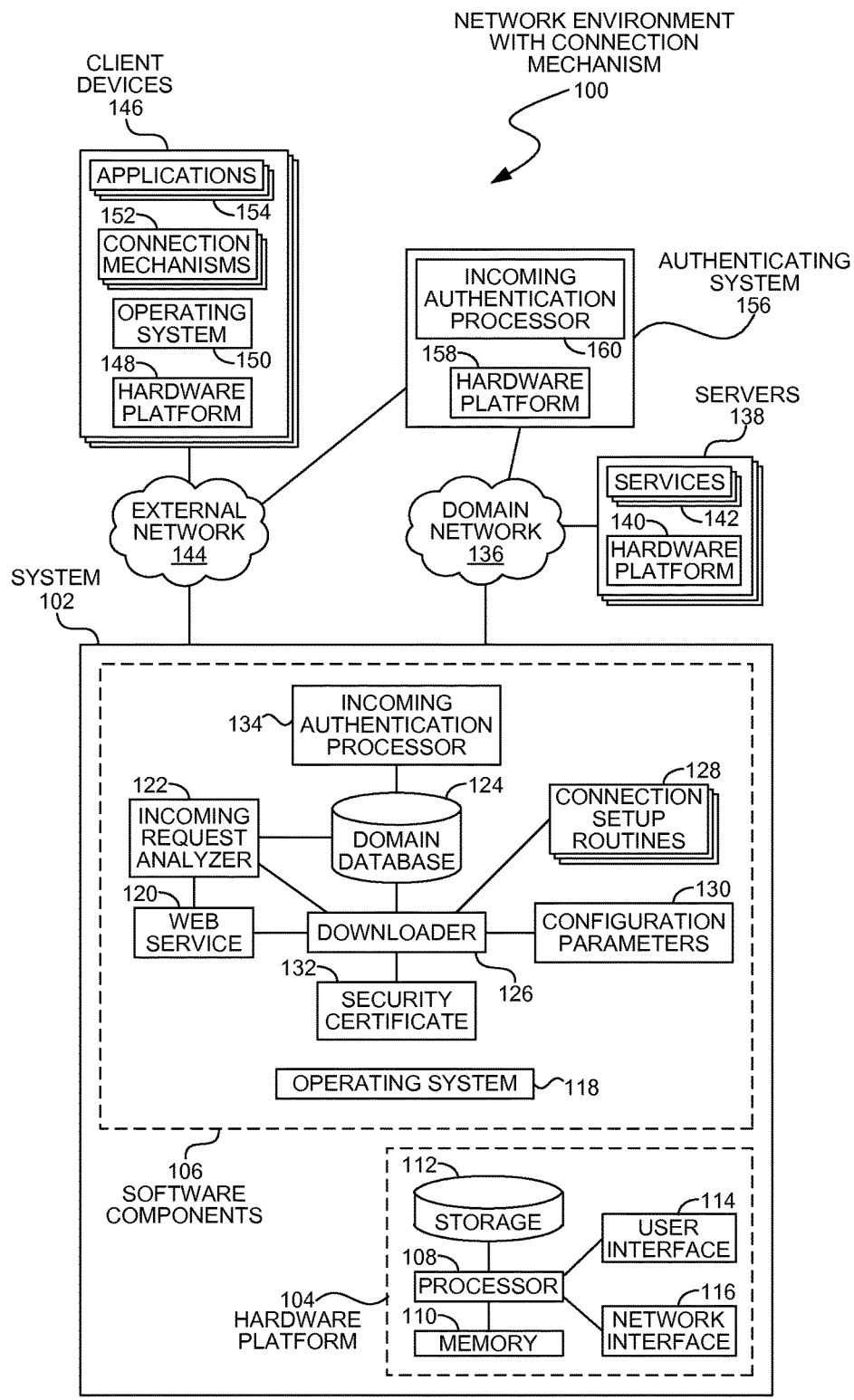
FIG. 1 is a diagram illustration of an embodiment showing a system for configuring a remote device for access to a domain.

A remote client may be authenticated and operate within a server's domain by a secure connection mechanism. The client may request access to the server, and the server may identify and classify the request. Based on the classification, the server may prepare a connection installation file that may be downloaded and installed on the client. The connection installation file may configure the client for one of several types of secure connections. When the client establishes a secure connection, the server may further configure the client for access to elevated services.

The client and server system may be deployed as a cloud based service that manages client devices. The server may provide various management services that may configure and manage the client device. Because the management services may have access to configuration aspects of the client device, and because the client device may have access to sensitive data that may be available from the server, all connections between the devices may be performed using secure connection technologies.

The initial connection request from a remote client to a server may be an unsecure request. In a typical embodiment, the initial connection request may be a request made through a web browser, for example. The server may examine the request to determine whether or not the request came from inside or outside a domain network. When the request comes from outside the domain network, the server may create a setup installation file and transmit the installation file to the client.

The client may install the setup installation file. The installation file may configure the client for one of several types of secure connections, based on the operating system and other configuration parameters of the client. After installation, a secure connection may be made to the server. Once the secure connection is made, a user may present credentials and be authenticated to join a domain. After the client is joined to the domain, the client and server may begin secure communications on a domain level.

The installation file may be created on-the-fly and may be customized for the potential connection mechanisms that a client device may use. In cases where user input may be used to select various options, the installation file may include a wizard or other user interface component. When the installation system can automatically determine a connection mechanism, the installation file may be configured to execute without a user interface.

In some embodiments, the installation file may be customized based on an entry in a domain database. The entry may be configured beforehand and may contain the device type and other configuration parameters. When a device type may be determined, a subset of the available connection mechanisms may be identified for inclusion in the installation file. When no such device type is available, all of the potential connection mechanisms may be included in the installation file.

When installation file is created, the various connection mechanisms may be customized or configured for the specific connection. Some embodiments may use different connection parameters for each device. Some such embodiments may not permit two devices to use the same connection. For example, each device may be assigned a specific port for a connection where no two devices share the same port. Such embodiments may permit fine grained control over how each device connects to a local network.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a network environment in which a client device may establish a secure connection with a server. The server may create an installation package and transmit that package to a client device prior to authenticating the client device.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 illustrates a network environment in which a system 102 may process connection requests from client devices 146. The initial contact between a client device 146 and the system 102 may be made in an unauthenticated manner. Such a request may be made, for example, through a web page where the client device may request a connection.

While the connection between the devices is unauthenticated, the system 102 may create an installation package for the client device. The installation package may include configuration parameters, scripts, executables, or other types of information that may be downloaded and installed on the client device. The client device may then be configured using one or more secure communication mechanisms by which a secure communication channel may be created between the devices.

The device 102 is illustrated having hardware components 104 and software components 106. The device 102 as illustrated represents a conventional computing device, although other embodiments may have different configurations, architectures, or components.

In many embodiments, the device 102 may be a server computer. In some embodiments, the device 102 may still also be a desktop computer, laptop computer, netbook computer, tablet or slate computer, wireless handset, cellular telephone, game console or any other type of computing device.

The hardware components 104 may include a processor 108, random access memory 110, and nonvolatile storage 112. The hardware components 104 may also include a user interface 114 and network interface 116. The processor 108 may he made up of several processors or processor cores in some embodiments. The random access memory 110 may be memory that may be readily accessible to and addressable by the processor 108. The nonvolatile storage 112 may be storage that persists after the device 102 is shut down. The nonvolatile storage 112 may be any type of storage device, including hard disk, solid state memory devices, magnetic tape, optical storage, or other type of storage. The nonvolatile storage 112 may be read only or read/write capable.

The user interface 114 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 116 may be any type of connection to another computer. In many embodiments, the network interface 116 may be a wired Ethernet connection. Other embodiments may include wired or wireless connections over various communication protocols.

The software components 106 may include an operating system 118 on which various applications and services may operate. An operating system may provide an abstraction layer between executing routines and the hardware components 104, and may include various routines and functions that communicate directly with various hardware components.

The software components 106 may include a web service 120 through which a client device 146 may communicate with the system 102. The web service 120 may respond to HTTP or other requests so that a user on a client device 146 may access the system 102 through a web browser or other application.

When a user communicates with the web service 120, the user may be given an option to download an installation package for a secure connection. The secure connection may allow the user to access services within a secure network. Some embodiments may have some services or data that may be accessible by the user without such a secure connection.

An initial request for communication from a client device 146 may be analyzed by an incoming request analyzer 122. The incoming request analyzer 122 may process the incoming request to obtain as much information as possible. In some embodiments, the incoming request analyzer 122 may analyze merely an HTTP request, while other embodiments may have some back-and-forth communication to obtain additional information.

From the initial request, the incoming request analyzer 122 may separate those devices within a local or domain network and those devices outside the network. Requests that come from within a local domain may proceed to authentication without an installation package. Requests that come from outside the local domain may have an installation package created and downloaded to the client prior to authenticating.

The incoming request analyzer 122 may query a domain database 124 to determine if the requested device has an entry in the domain database. When the device may be attempting to connect remotely and the device does not have an entry in the domain database, some embodiments may refuse a connection request. Such embodiments may permit remote connections when the domain database entry is created before the request and may otherwise reject requests. Such embodiments may provide an additional layer of security, as each remote secure connection may have to be manually configured prior to connecting.

For many client devices, the configuration of secure connection mechanisms may be tedious or confusing for a lay person. Some secure connections may have specific addresses or configuration parameters that are used to establish secure connections, and these addresses and parameters may be difficult or confusing for a user to enter and configure.

A downloader 126 may create an installation or setup file that may be downloaded and executed by a remote client. The setup file may include addresses, configuration information for various connections, security certificates, and scripts or other executable code.

The setup file may include addresses or other connection information for a secure connection. In some embodiments, the addresses included in the setup file may be Internet Protocol (IP) addresses in either or both IPv4 or IPv6 protocols. Some embodiments may establish various ports or other connection parameters as well.

In some embodiments, a secure connection may be accepted through a single address for multiple remote devices. Such embodiments may direct all secure connections to a single port or address on a single authenticating system.

Other embodiments may include multiple connection addresses. In such embodiments, a secure connection may be attempted through many different servers, each having a separate address. Such embodiments may be used where load balancing or redundancy may be desired. When one server is unavailable either by being overloaded or being offline, the client may direct a request to another server.

Multiple connection mechanisms may be available for remote devices to connect securely. For example, some devices may support Virtual Private Network (VPN) connections, secure tunneling through IPSec, or other connection mechanisms that may be available through traditional Internet connections. Other devices may support various secure connections available through cellular telephone networks or other communications networks.

The setup file may include executable code, which may be binary executable code, scripts, or other instructions that may be executed by the client device. The executable code may configure the remote device for a secure connection. In some embodiments, the executable code may be capable of executing without user interaction. Other embodiments may have some user interaction.

The downloader 126 may create a setup file for a client device that is tailored to the client device's capabilities. The downloader 126 may retrieve connection setup routines 128 that correspond with the capabilities of the remote device. Various configuration parameters 130 for the secure connections may also be included.

Various security components may be included in a setup file. The components may include a security certificate 132, from which a public encryption code may be derived. The public encryption code may be used to encrypt transmissions sent to the server, as well as to decrypt communications from the server.

An incoming authentication processor 134 may receive and process the secure connection requests. The incoming authentication processor 134 may authenticate a connection requests against the domain database 124 to determine whether or not a secure connection may be established. Once authentication is successful, a remote device may be joined to a local domain and given access to various services within the network.

The system 102 may be connected to two networks: a domain network 136 and an external network 144.

The domain network 136 may include various servers 138 that may have a hardware platform 140 providing various services 142. In a typical deployment, the services 142 may include file services, access to applications, or other services. In a commercial or enterprise environment, the services may contain sensitive data.

In some embodiments, the domain network 136 may also include an authenticating system 156. The authenticating system 156 may have a hardware platform 158 on which an incoming authentication processor 160 may execute. In some embodiments, one system 102 may process non-secure requests while a second authenticating system 156 may provide authenticated, secure connections to the domain network 136.

The external network 144 may be an insecure network, such as the Internet. Various remote client devices 146 may attempt to establish secure connections with the domain network 136.

The remote client devices 146 may have various hardware platforms 148 on which an operating system 150 may operate. The operating system 150 may have different connection mechanisms 152 that may be accessed by various applications 154. The applications 154 may include web browsers and other applications.

The remote client devices 146 may be any type of computing device, such as personal computers, servers, game consoles, cellular telephones, tablet computers, or any other computing device.

Figure 2:
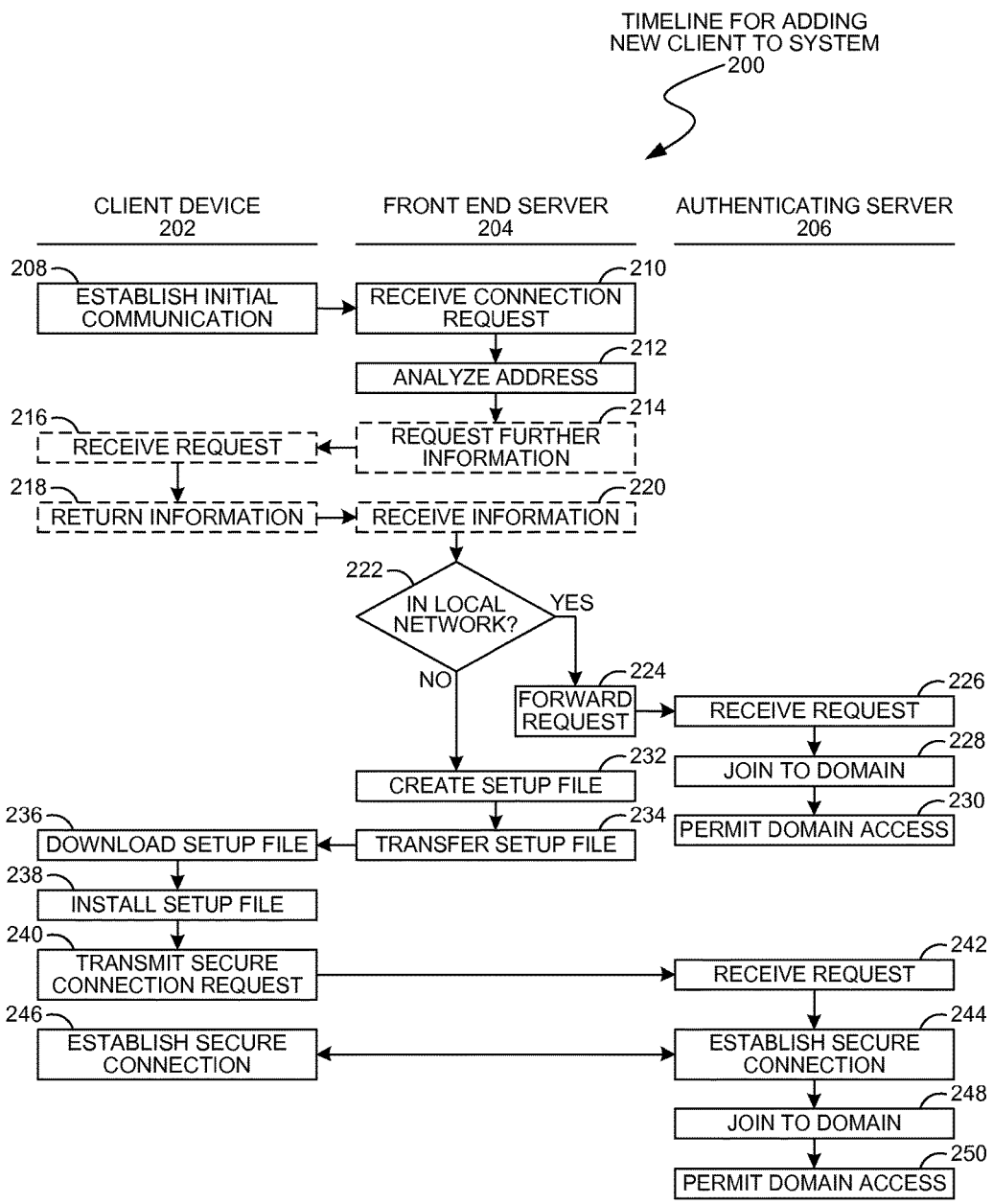
FIG. 2 is a flowchart illustration of an embodiment showing a method for adding a new client.

FIG. 2 is a timeline illustration of an embodiment 200 showing a method for adding remote clients to a system. The process of embodiment 200 illustrates the operations of a client device 202 on the left column, the operations of a front end server 204 in the center column, and the operations of an authenticating server 206 in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates a simplified exchange between a client device 202 and various servers prior to establishing a secure connection. The front end server 204 may create an installation routine that may be installed or executed on the client device 202. Once installed, the client device 202 may be able to establish secure connections with an authenticating server 206.

The client device 202 may establish an initial connection in block 208 with the front end server 204. The front end server 204 may receive the connection request in block 210 and analyze the address or other components of the request in block 212.

The analysis of the request in block 212 may attempt to identify the origin of the client device 202. In some embodiments, the front end server 204 may request further information in block 214, which may be received in block 216 and information returned in block 218 by the client device 202. The additional information may be received in block 220.

If the front end server 204 determines that the client device is inside the local network in block 222, the request may be forwarded in block 224 to the authenticating server 206. The authenticating server 206 may receive the request in block 226, may join the device to the domain in block 228, and may permit access to the network in block 230.

If the requestor is not in the local network in block 222, a setup file may be created in block 232. An example of a process for creating a setup file may be found in embodiment 300 later in this specification.

The setup file may be transferred in block 234 by the front end server 204 and downloaded in block 236 by the client device 202. The client device 202 may install the setup file in block 238, then transmit a secure connection request in block 240 to the authenticating server 206.

The authenticating server 206 may receive the request in block 242 and may establish a secure connection in blocks 244 and 246. As part of the secure connection, a user or device may present credentials that may be used to authenticate the user and device to the domain network. Once authenticated, the client device may be joined the domain network in block 248 and access to the domain may be permitted in block 250.

Figure 3:
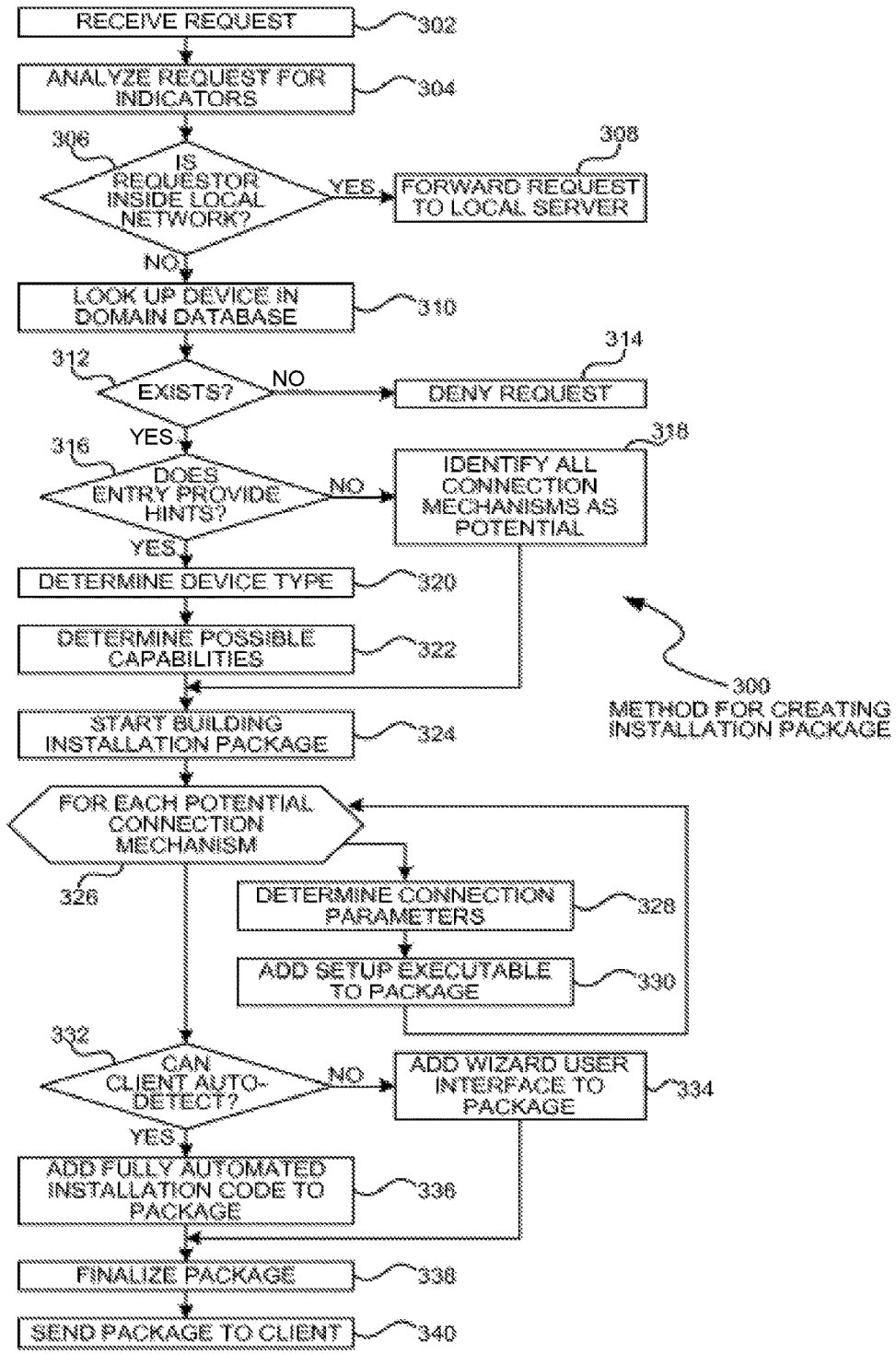
FIG. 3 is a flowchart illustration of an embodiment showing a method for creating an installation package.

FIG. 3 is a flowchart illustration of an embodiment 300 showing a method for creating an installation package. The process of embodiment 300 may be performed by a downloader, such as the downloader 126 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates a method for creating a customized installation file in response to a secure request. The installation file may be customized to include specific parameters for any connection or authentication mechanism, and may also include installation executables that may be used by a client device to configure a secure connection. In some embodiments, a single setup file may contain configuration information for several different types of secure communication mechanisms.

In block 302, a request may be received. The request may be analyzed in block 304 for any indicators. An indicator may be any identifier, address, or other information that may be used to determine the origin or transmission route of the request. From the analysis, the requestor may be classified as being inside or outside of the local network. If the requestor is inside the local network in block 306, the request may be forwarded to a local authentication server in block 308.

If the requestor is determined to be outside the local network in block 306, the device may be looked up in a domain database in block 308. If an entry is not found in the domain database in block 312, the request may be denied in block 314.

If the requestor does have an entry in block 312, some embodiments may have hints or additional information about the requestor in block 316. The hints may include metadata about the device, such as device type, operating system, available connections, or other information.

When no additional hints may be available in block 316, all potential connection mechanisms may be selected in block 318. When some hints are available in block 316, the device type may be determined in block 320 and the possible connections may be identified in block 322.

An installation package may begin construction in block 324.

For each potential connection mechanism in block 326, the connection parameters for that connection mechanism may be determined in block 328 and the setup executable for the connection mechanism may be added to the connection package in block 330.

Given the parameters of the device and possible connections, an analysis may be made in block 332 to determine whether or not the client device may be able to automatically detect which connection mechanism may be appropriate. If the client cannot auto-detect in block 332, a wizard or other user interface component may be added to the package in block 334. If the client can auto-detect in block 332, fully automated installation code may be added to the package in block 336.

The installation package may be finalized in block 338 and may be transmitted to the client device in block 340.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A server comprising:
   a processor;
   a request analyzer, executed by said processor, that:

receives a request for a connection from a client device;
determines that said request is an unsecure request;
determines an address for said request; and
determines whether said address is within or outside a domain;
a downloader, executed by said processor, that:
in response to said address being outside said domain, and while connection with said client device is unsecure, creates a setup file comprising:
an address for said server;
a setup configuration for a secure connection mechanism; and
a security certificate for said server; and
transmits said setup file to said client device for installation by said client device; and
an authentication processor that:
receives a secure connection request from said client device;
establishes a secure connection with said client device using said secure connection mechanism; and
joins said client device to said domain,
wherein in response to said address being within said domain, said authentication processor authenticates said request without said setup file being transmitted by said downloader to said client device for installation by said client device.

2. The server of claim 1, wherein said request analyzer determines that an account for said client device exists if an entry for said client device exists in a database associated with said domain.

3. The server of claim 1, wherein said request analyzer:
determines that an account for said client device does not exist if an entry for said client device does not exist in a database associated with said domain; and
stops processing said request.

4. The server of claim 1, wherein said setup file further comprises an additional setup configuration for an additional secure connection mechanism.

5. The server of claim 1, wherein said setup file further comprises an installation routine executable on said client device.

6. The server of claim 1, wherein said setup file:
analyzes at least one parameter on said client device; and
uses said at least one parameter to select between said secure connection and an additional secure connection.

7. The server of claim 1, wherein said setup file comprises a user interface wizard.

8. The server of claim 1, wherein said setup file configures said client device to connect using said secure connection mechanism for future requests.

9. The server of claim 1, wherein said secure connection mechanism comprises a virtual private network connection.

10. The server of claim 1, wherein said secure connection mechanism comprises an IPSec tunnel between said client device and said server.

11. A method comprising:
receiving a request for a connection from a client device;
determining that said request is an unsecure request;
determining an address for said request;
determining whether said address is within or outside a local domain;
determining that said client device has an existing account on said local domain and that said client device is to be joined to said local domain;
in response to said address being outside said local domain, while connection with said client device is unsecure, creating a setup file comprising:
an address for a secure connection;
a setup configuration for a secure connection mechanism; and
a public key for a security certificate for said local domain; and
transmitting said setup file to said client device for installation by said client device;
receiving a secure connection request from said client device;
establishing a secure connection with said client device using said secure connection mechanism; and
joining said client device to said local domain; and
in response to said address being within said local domain, authenticating said request without transmitting said setup file to said client device for installation by said client device.

12. The method of claim 11 further comprising decrypting at least a portion of said request using a private key for said security certificate.

13. The method of claim 11, wherein said setup file further comprises an executable code that configures said client device to establish a connection using said secure connection mechanism for subsequent requests.

14. The method of claim 11, wherein said setup file further comprises an additional setup configuration for an additional secure connection mechanism.

15. The method of claim 11, wherein said setup file analyzes said client device to select between said secure connection mechanism and an additional secure connection mechanism.

16. The method of claim 11, wherein said request is received by a first server and said secure connection request is received by a second server.

17. A server comprising:
a processor;
a request analyzer, executed by said processor, that:
receives a request for a connection from a client device;
determines that said request is an unauthenticated request;
determines an address for said request;
determines whether said address is within or outside a domain;
determines a host name for said client device;
determines that said host name has an account on said domain and that said client device is to be joined to said domain; and
launches a downloader based on said account in response to said address being outside said domain;
wherein said downloader:
while connection with said client device is unauthenticated, creates a setup file comprising:
an address for said server;
a setup configuration for a secure connection mechanism;
a security certificate for said server; and
an executable code to configure said client device to perform a secure connection; and
transmits said setup file to said client device for installation by said client device; and
an authentication processor that:
receives a secure connection request from said client device;
determines that said secure connection request complies with said secure connection mechanism;
establishes a secure connection with said client device using said secure connection mechanism; and
joins said client device to said domain, wherein in response to said address being within said domain, said authentication processor authenticates said request without said setup file being transmitted by said downloader to said client device for installation by said client device.

18. The server of claim 17, wherein said secure connection mechanism comprises an IPSec tunnel.

19. The server of claim 17, wherein said authentication processor is separate from said request analyzer.

20. The server of claim 17, wherein said request analyzer is a website configured to receive said request for a connection.

* * * * *